Oct. 7, 1930.  M. S. BLACK  1,777,481
ATTACHMENT FOR FISHING TOOLS AND THE LIKE
Filed Jan. 4, 1926
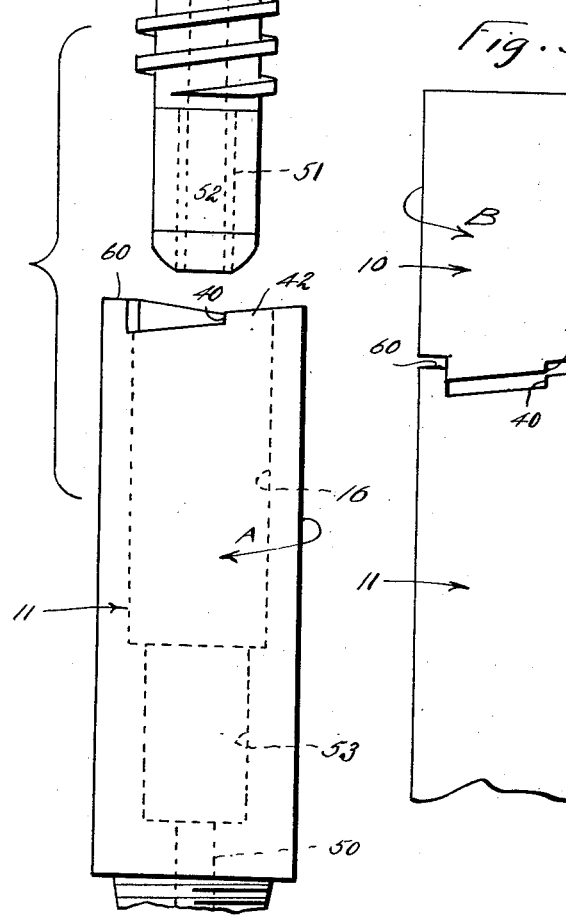
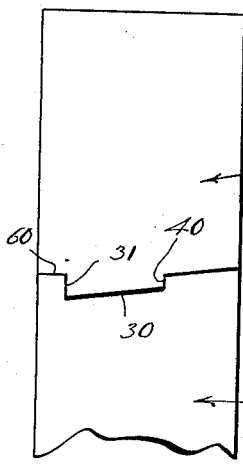
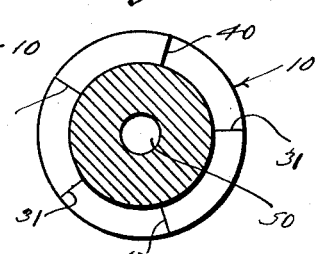
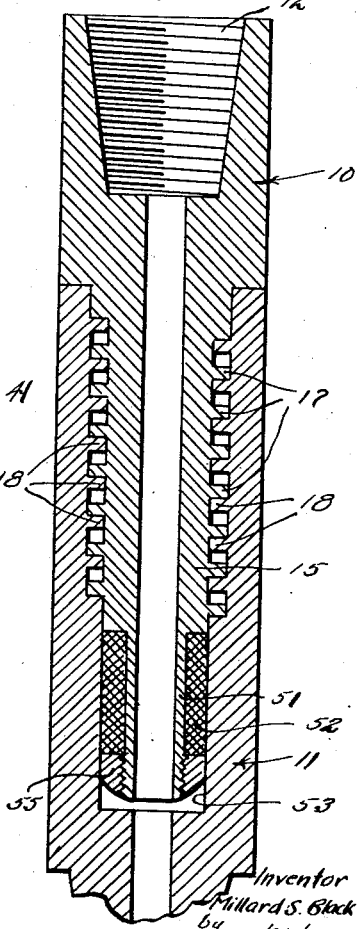
Inventor
Millard S. Black
by
his Attorney Patented Oct. 7, 1930

1,777,481

UNITED STATES PATENT OFFICE

MILLARD S. BLACK, OF HUNTINGTON PARK, CALIFORNIA

ATTACHMENT FOR FISHING TOOLS AND THE LIKE

Application filed January 4, 1926. Serial No. 79,090.

This invention relates to a device for use in connection with well drilling tools and has particular reference to an attachment for fishing tools and the like.

In the course of drilling wells it is occasionally necessary to operate fishing tools to remove lost parts. A wide variety of fishing tools have been developed to perform different operations; certain of these tools, or attachments therefor, require at some stage of operation or for accomplishing certain operations, rotation of the operating means in a reverse direction. In practice it sometimes happens that the lost part can not be removed after it is engaged by the fishing tool, in which case it is necessary to disengage or disconnect the tool and operating member, leaving the tool in the well.

It is an object of my present invention to provide a device for releasably connecting two parts, for instance a fishing tool and operating pipe, so that rotary motion can be imparted from one part to the other in both directions.

It is a further object of my invention to provide a releasable connection of the character mentioned, in which releasement of the connection is accomplished by rotation and which is operable to drive or transmit rotary motion in either direction.

A further object of this invention is to provide a device of the character mentioned, which is simple and reliable in operation and also simple, secure and durable in construction.

The objects and features of my invention will be best and more fully understood from the following detailed description of a typical preferred form of the invention, throughout which description reference is had to the accompanying drawings, in which:

Fig. 1 is a side elevation of the device provided by this invention showing the two sections thereof disconnected;

Fig. 2 is a side elevation of the device showing the parts connected and in position where they will operate to transmit rotary motion in either direction;

Fig. 3 is a view similar to Fig. 2, showing the parts in position where rotation in one direction will cause them to become disconnected;

Fig. 4 is a detailed transverse sectional view taken as indicated by line 4—4 on Fig. 1; and Fig. 5 is a longitudinal detailed sectional view showing the parts connected as shown in Fig. 2.

The construction provided by this invention is particularly useful as applied to fishing tools used in well drilling, and is capable of application to such tools either as a permanent or integral part thereof, or as an attachment. When I use the term fishing tool, I do not mean to limit myself to any particular type or form of tool but refer, generally, to tools of this character and to parts or attachments that are used in connection with such tools. For the purpose of simplifying the present disclosure of my invention so that it will be readily understood I have herein set forth the invention in a form suitable as an attachment that can be applied to or used in connection with, any other desired tools. The particular device which I will describe may be coupled with the fishing tool, or may be inserted in the string of the drilling pipe through which the fishing tool is being operated.

The device shown in the drawings being intended as an attachment applicable to or for insertion in, a fishing tool or string of drilling pipe includes, generally, two sections 10 and 11. I will, for the sake of example, refer to the section 10 as the upper section, and to section 11 as the lower section, it being understood that this positioning or relationship can be reversed without altering the function of the parts. It is convenient in practice to construct the device embodying my invention so that it may be inserted in a standard tool joint, or between a tool joint section and a part made to cooperate with a tool joint section. For instance, the section 10 may be formed at its upper end with a tapered coarsely screw threaded socket 12 to receive the pin of a tool joint section, while the section 11 may be provided at its lower end with a tapered coarsely screw threaded projection to fit the socket and tool joint section.

My present invention provides means whereby the two parts, for instance the sections 10 and 11, are detachably connected so that they are releasable by rotation of one of the parts with reference to the other and are operable so that one of the parts can be operated or rotated in both directions from the other. This connecting means includes a cooperating pin and socket on the adjoining ends of the sections, for instance a pin 15 on the lower end of the section 10 and a socket 16 in the upper end of the section 11. The projection or pin 15 is provided with comparatively coarse screw threads 17, preferably acme threads, and the socket 16 is provided with correspondingly pitched threads 18 to receive the threads on the pin. With this construction connection is made between the sections 10 and 11 by relative rotation between the sections to cause screw threading of the pin into the socket.

The inner or adjacent ends of the sections 10 and 11 have helicoidal faces 30 and radially disposed shoulders 31 that are substantially transverse of the faces and of the screw threads above mentioned. The inner end of each of the sections is provided with two shoulders 31 and two faces 30 pitched in the same direction. The faces are located outward of, or around, the pin and socket and are proportioned so that the shoulders 31 on the two sections engage when the sections are completely together. The faces 30 are correspondingly pitched and are pitched to correspond to the threads of the pin and socket. The various parts, for instance the relative lengths of the pin and socket, the screw threads of the pin and socket, the faces 30 and shoulders 31, are related and proportioned so that the shoulders 31 of the two sections are movable into cooperative engagement as shown in Figs. 2 and 3 of the drawings, upon screw threading of the pin 15 into the socket. Further, in practice the various parts are proportioned so that the threads of the pin and socket operate freely so that the pin 15 can be freely operated in the socket to move the shoulders 31 into and out of cooperative engagement. The general construction thus far described is common to devices known in the art as safety joints, and is operable to allow the sections 10 and 11 to be easily connected or disconnected by rotation between the two sections, and to cause the section 11 to be rotated from, or through the section 10 in the direction indicated by the arrow A in Fig. 1 of the drawings, by rotation of the section 10 in the direction to cause the pin to screw thread into the socket after, or when, the shoulders are in cooperative engagement. The driving strain in this case is transmitted from the section 10 to the section 11 through the shoulders, the screw threads merely operating to hold the two sections with the shoulders in proper cooperative engagement.

My invention provides in addition to the parts thus far described, shoulders 40 at the adjoining ends of the sections 10 and 11, faced opposite to the shoulders 31. These shoulders 40 are preferably formed at the faces 30. For instance, they may be formed at the faces 30 of the section 10 by providing suitable recesses or depressions 41 in the faces 30 of the section 10, and may be formed at the faces 30 of the section 11 by providing projections or lugs 42 on the faces 30 of the section 11 at points corresponding to the location of the depressions 41 in the faces 30 of the section 10. For movement of the shoulders 40 into and out of, cooperative engagement, I provide for certain movement between the sections 10 and 11 in a longitudinal direction. This movement may be provided for by designing or proportioning the screw threads 17 and 18 so that they have considerable looseness in a direction longitudinal of the sections, this looseness being sufficient to allow movement between the sections to move the shoulders 40 into and out of engagement. In Fig. 2 of the drawings I show the sections in position where the shoulders will cooperate, while in Fig. 3 I show the sections in position where the shoulders will not cooperate. In order that the operation of the shoulders, that is the movement of the shoulders into and out of cooperative engagement, may be independent of the cooperative relationship of the shoulders 31, I relatively proportion the shoulders 31 and 40 so that the longitudinal movement which occurs between the sections to move the shoulders 40 of the two sections into and out of cooperative engagement, is not sufficient to change the relationship of the sections, so that the shoulders 31 thereof, will fail to cooperate. For instance, as I have clearly shown in the drawings, the shoulders 40 may be made much shorter or smaller in a longitudinal direction than the shoulders 31. In fact they may be made only about one-half the size of the shoulders 31. When the sections are screwed together, for instance while in the well, there is a downward pressure on the upper section 10 and the looseness in the threads allows the upper section to be in a down position relative to the lower section. I provide a cam face 60 on the section 11 adjoining one of the faces 30 so that it is engaged by one of the projections 42 as the sections screw together causing the upper section to assume an up position with reference to the lower section so that the projections 42 drop or lower into the depressions 41 when the sections are completely screwed together.

It is desirable, in fact necessary in some cases, that fluid circulation be established or maintained during the operation of the fishing tool. So therefore, I provide the sections 10 and 11 with central longitudinal openings 50 to pass the circulating fluid. The looseness in the screw threaded connection between the pin 15 and socket, both for allowing free rotation between the sections and for allowing longitudinal movement between the sections, may cause a substantial leakage of circulating fluid between the sections, so therefore I provide an extension 51 on the outer end of the pin 15 to carry packing 52 adapted to seat in a suitable recess 53 in or at the bottom of the socket 16. The packing 52 may be tubular in form and may be retained on the extension 51 by a suitable retaining nut 55 in the manner clearly shown in Figs. 1 and 5 of the drawings. The recess 53 is formed concentrically with the socket and is proportioned to receive the packing so that the proper fluid tight connection is made between the sections.

In operation the tool is applied to, or arranged in connection with, a fishing tool, or the like, for instance in connection with a jar applied to a fishing tool. During ordinary operations, for instance during lowering of the parts into the well and during rotation of the fishing tool into engagement with the part to be removed from the well, the sections 10 and 11 of my device may be together in the relative positioning shown in Fig. 2. When the parts are in this relation the shoulders 31 of the two sections are in cooperative engagement so that the section 11 and parts connected therewith may be positively rotated from or through the section 10, and also the shoulders 40 are in position to cooperate so that the section 11 may be positively rotated in the opposite direction by opposite rotation of the section 10. This reverse operation may be required to perform various operations, for instance to set or trip a suitable part of the fishing tool or the jar in connection with the fishing tool. If for any reason it becomes necessary to disconnect the sections 10 and 11 or to rotate the section 10 freely with reference to the section 11 in the direction indicated by the arrow B in Fig. 3, it is merely necessary to apply an up strain to the section 10 lifting it upward with reference to the section 11, until the sections are in the relative positioning shown in Fig. 3, whereupon they are freely rotatable in the direction indicated by the arrow B. Continued rotation in this direction will allow the sections to completely disconnect.

Having described only a typical preferred form of my invention I do not wish to limit myself to the specific details set forth, but wish to reserve to myself any changes or variations that may appear to those skilled in the art or fall within the scope of the following claims.

Having described my invention I claim:

1. A tool of the character described including, two sections, a screw thread connection for the sections, the screw thread on one section being narrower than the groove on the other section to allow longitudinal movement between the sections when they are connected, and means whereby one of the sections can be positively rotated by the other in each direction, said means being releasable by said longitudinal movement between the sections to allow free relative rotation between the sections.

2. A tool of the character described including, two sections, the sections having cooperating threads fitting loosely in a longitudinal direction allowing limited relative movement between the sections in a longitudinal direction when the threads are in cooperative engagement, the sections being releasable by rotation between the sections in one direction, and projecting parts on the sections related to the threads to cooperate when the threads are in cooperative engagement so that one of the sections can be rotated from the other in either direction, said last-mentioned parts being releasable by longitudinal movement between the sections to allow rotation between the sections to release the screw connection.

3. A tool of the character described including, two sections having threads detachably connecting the sections, there being clearance between the threads so that the sections have a limited relatively longitudinal movement when connected, cooperating shoulders on the sections whereby one section is positively rotatable from the other section in one direction when the sections are connected with the threads in mesh, and means whereby said one section is positively rotatable from said other section in the other direction when the sections are connected with the threads in mesh, said means being releasable by longitudinal movement of one section relative to the other.

4. A tool of the character described including, two sections, a screw thread connection for the sections loose in a longitudinal direction to allow longitudinal movement between the sections when they are connected, parts on the sections whereby one of the sections can be positively rotated from the other in either direction releasable by longitudinal movement between the sections when the threads are in mesh to allow rotation between the sections in one direction, and means to cause relative longitudinal movement between the sections operable by rotation between the sections.

5. A tool of the character described including, two sections, a screw thread connection for the sections loose to allow longitudinal movement between the sections when they are connected, parts on the sections cooperating when the screw thread connection is engaged whereby one of the sections can be positively rotated from the other in either direction releasable by longitudinal movement between the sections to allow rotation between the sections in one direction, and cam means operating to cause relative longitudinal movement between the sections actuated by rotation between the sections.

In witness that I claim the foregoing I have hereunto subscribed my name this 15th day of December, 1925.

MILLARD S. BLACK.